May 23, 1933. N. K. ENGST 1,910,155
CIRCUIT CONTROL DEVICE
Filed Jan. 13, 1931
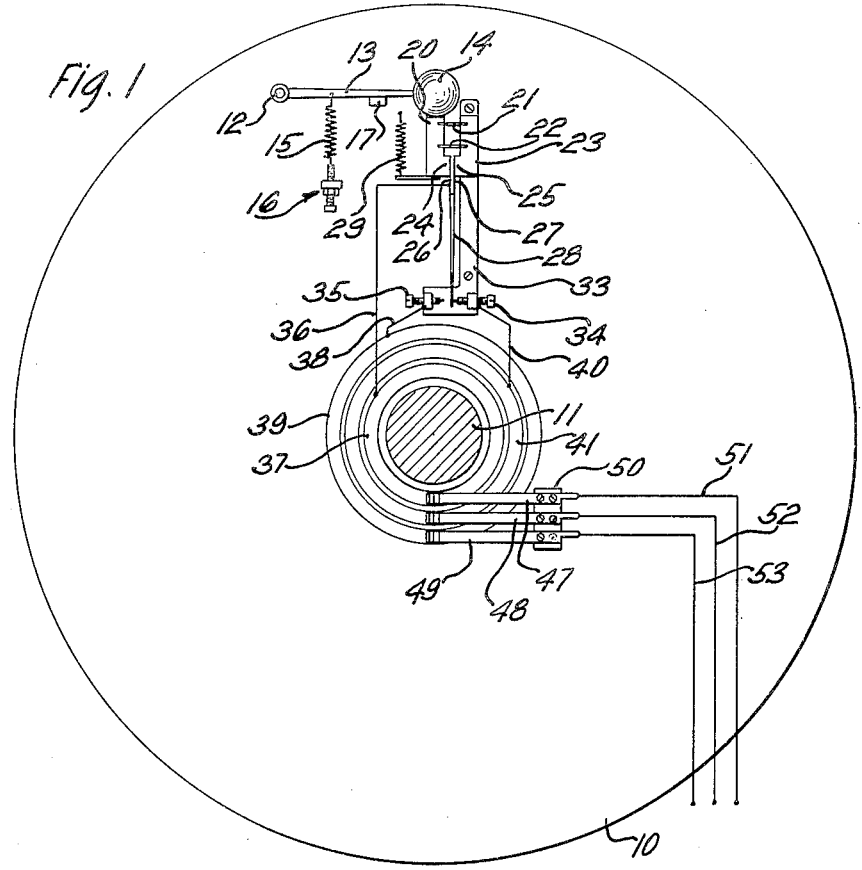
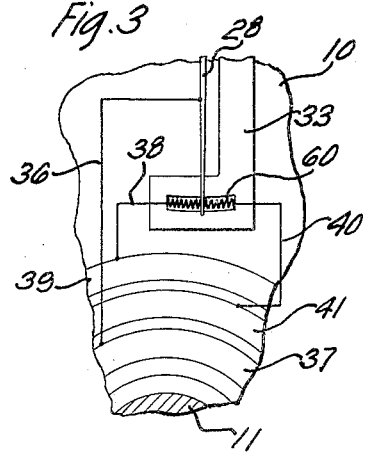
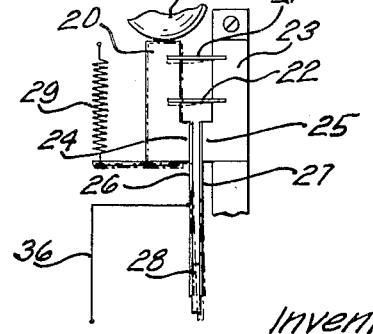
Inventor
N. K. Engst
By H. B. Whitfield Att'y Patented May 23, 1933

1,910,155

UNITED STATES PATENT OFFICE

NORBERT K. ENGST, OF CICERO, ILLINOIS, ASSIGNOR TO WESTERN ELECTRIC COMPANY, INCORPORATED, OF NEW YORK, N. Y., A CORPORATION OF NEW YORK

CIRCUIT CONTROL DEVICE

Application filed January 13, 1931. Serial No. 508,485.

This invention relates to a circuit control device, and more particularly to a device for controlling a circuit in response to changes in the speed of a rotating member.

It is an object of this invention to provide a simple and highly sensitive circuit control device responsive to the speed of a rotating member.

In accordance with one embodiment, the invention contemplates a device which may be fixed to a rotatable member wherein an increase in speed causes a circuit controlling member to open or close electrical switches controlling the speed of the machine. The circuit controlling member is supported by two cantilever springs, one of which is secured to the rotating member and the other of which is secured to a weighted member which tends to move radially of the rotating member upon an increase or decrease in the angular speed of the rotating member to move the circuit controlling member into or out of engagement with electrical contact members which may be connected to an indicating device or to an electrical pilot motor or control means for a power supply for the rotating member.

A complete understanding of the invention may be had by reference to the following description when taken in conjunction with the accompanying drawing, wherein Fig. 1 is a front elevational view of a fly wheel having a circuit control device mounted thereon which embodies the features of the present invention;

Fig. 2 is an enlarged view of a portion of the device showing in detail the means for supporting the control member, and Fig. 3 is a fragmentary view of another embodiment of the invention.

Referring now to the drawing wherein like reference characters designate the same parts throughout the several views, the numeral 10 designates generally a fly wheel having mounted thereon a control device which embodies the features of the present invention. The fly wheel 10 is mounted upon a shaft 11 and may be rotated by an electric motor or other power means (not shown). Pivotally secured to the fly wheel 10 at 12 is a lever 13 having a weight 14 mounted thereupon and adapted to be moved radially of the fly wheel by centrifugal force. An adjustable spring 15 secured to the lever 13 intermediate its ends normally tends to draw the weight 14 toward the axis of the fly wheel against a stop member 17, and the tension of the spring may be adjusted by the manipulation of a set screw and lock nut adjusting device designated generally by the numeral 16, the stationary portion of the device being secured to the fly wheel.

The weight 14 is urged by the spring 15 into engagement with the end of a floating block 20 supported upon the ends of double cantilever springs 21 and 22, the opposite ends of which are fixed to a supporting base 23 mounted upon the fly wheel thereby forming a frictionless guide and support for the floating block 20. The base 23 and the floating block 20 have projections 24 and 25 extending toward each other for receiving the ends of light weight cantilever springs 26 and 27, which extend inwardly toward the axis of the fly wheel and carry an indicating and control member 28 for which they form not only a support but a frictionless pivot. The movement of the control member 28 will then be approximately proportional to the movement of the floating block 20 in the ratio of the length of the control member to the distance between the centers of the cantilever springs 26 and 27.

One end of a biasing spring 29 is secured to the inner end of the floating block 20 and the other end thereof is secured to the fly wheel 10 for opposing the spring 15 to double the arc of movement of the control member 28 and reduce the vibration of the control member when it is approximately in the middle of its arc of movement. An inwardly extending portion 33 of the supporting base 23 has mounted thereon a pair of adjustable contact members 34 and 35 which are insulated from the base 23 and are adapted to contact with the extending tip of the control member 28. The control member 28 is connected by means of a conductor 36 to a commutator ring 37, the adjustable contacting member 35 is connected through a conductor 38 to a commutator ring 39, and the other contact member 34 is connected through a conductor 40 to a commutator ring 41. The commutator rings 37, 41 and 39 are concentrically arranged about the shaft 11 and are insulated from the fly wheel 10 and adapted to be engaged by commutator brushes 47, 48 and 49, respectively, mounted upon a stationary insulating block 50 positioned adjacent the fly wheel, leads 51, 52 and 53 being connected to the brushes 47, 48 and 49, respectively, for interconnecting the brushes with a suitable pilot motor, indicating device, or control means (not shown) for regulating or indicating the speed of rotation of the fly wheel 10 in accordance with the movements of the control member 28.

In another embodiment of the invention as shown in Fig. 3 the conductors 38 and 40 instead of being connected to contacts such as shown in Fig. 1 are connected to the opposite ends of a resistance element 60 which is mounted upon and insulated from the inwardly extending portion 33 of the supporting base 23. In this embodiment of the invention the control member 28 is utilized as a movable arm which with the resistance 60 constitutes a rheostat adapted to control the resistance in a control circuit (not shown) to vary the amount of effective electromotive force therein.

A better understanding of the invention will be had by reference to the following brief description of the operation of the embodiments disclosed. Assuming that it is desired to control accurately the speed of rotation of the shaft 11 the spring 15 may be adjusted to exert the desired amount of tension upon the lever 13 to draw the weight 14 radially inward toward the axis of rotation of the shaft 11, thereby through the action of the cantilever springs 21, 22, 26 and 27 to hold the control member 28 in engagement with the contact 34 as shown in solid lines in Fig. 1 and in dotted lines in Fig. 2 until the rate of speed of the shaft 11 reaches the predetermined value. While the control member 28 is in engagement with the contact 34 circuit connections will be completed from the lead 51 running to the pilot motor (not shown), through the brush 47, commutator ring 37 and lead 36 to the control member 28 and thence through the contact 34, lead 40, commutator ring 41 and brush 48 to the lead 52, also connected to the pilot motor. This connection will be maintained until the fly wheel 10 reaches the speed necessary to move the weight 14 outwardly due to centrifugal force, thereby breaking the connection between the control member 28 and the contact 34 to interrupt the action of the pilot motor. If the driving motor overruns to such an extent as to cause the weight 14 to continue in its radially outward movement the control member 28 will be moved over into engagement with the contact 35 to complete a circuit from the lead 51, through the brush 47, commutator 37, lead 36, control member 28, and thence through the contact 35, lead 38, commutator ring 39, brush 49, and lead 53 to reverse the action of the pilot motor in any known manner, thereby to slow down the rotating fly wheel.

By utilizing the device described hereinbefore it will be apparent that due to the great magnification of the movement of the weight 14 the speed of rotation of the fly wheel 10 and shaft 11 may be maintained within very close limits since the slightest movement of the weight 14 will cause a comparatively great amount of movement of the control member 28 to break the circuit between the control member 28 and either of the contacts 34 and 35. There being no frictional losses or frictional pivots where lost motion might occur the sensitivity of the device is very great since any movement of the weight will cause the control member to move a proportional amount.

In the modification shown in Fig. 3 the movement of the control member 28 over the surface of the resistance element 60 will serve to introduce or decrease the resistance in the driving circuit upon movement of the control member across the resistance unit 60 and in this particular embodiment the slightest movement of the weight 14 will serve to actuate the member 28 to move through a comparatively large portion of the resistance 60.

Although specific embodiments of the invention have been disclosed herein it is to be understood that many adaptations and modifications of the disclosed structure may be made without departing from the scope of the appended claims.

What is claimed is:

1. A circuit controlling device comprising a rotatable member, a fixed contact member supported thereon, a movable contact member, a cantilever spring carrying the movable contact member and secured to the rotatable member, a second cantilever spring secured to the movable contact member, a centrifugally actuated weight for acting upon said second spring, and means for causing said second spring to move in the direction of its length in response to actuation by said weight to shift the movable contact member laterally.

2. A circuit controlling device comprising a rotatable member, a movable control member, a cantilever spring carrying the control member and secured to the rotatable member, a second cantilever spring secured to the control member, and centrifugally actuated means for moving the second cantilever spring in the direction of its length to shift the control member laterally.

3. A circuit controlling device comprising a rotatable member, a fixed support thereon, a movable support, means for attaching the movable support to the fixed support so as to maintain them substantially parallel, a pair of cantilever springs having one end attached to the supports and carrying a common control member at the other end, and centrifugally actuated means for actuating said movable support.

In witness whereof, I hereunto subscribe my name this 30th day of December A. D., 1930.

NORBERT K. ENGST.